United States Patent [19]

Hageman

[11] 3,839,279

[45] Oct. 1, 1974

[54] POLYALKADIENES STABILIZED WITH DITHIO-BIS(BETA-ARYLALKYLENE)DIPHENOLS

[75] Inventor: Howard A. Hageman, Southbury, Conn.

[73] Assignee: Uniroyal Inc., New York, N.Y.

[22] Filed: Jan. 22, 1973

[21] Appl. No.: 325,292

Related U.S. Application Data

[62] Division of Ser. No. 251,723, May 8, 1972, which is a division of Ser. No. 13,749, Feb. 24, 1970, Pat. No. 3,686,325.

[52] U.S. Cl....... 260/45.95 C, 260/45.7 S, 260/608, 260/799
[51] Int. Cl........................ C08c 13/08, C08d 11/04
[58] Field of Search.......... 260/45.95 C, 45.7 S, 799

[56] References Cited
UNITED STATES PATENTS

| | | | |
|---|---|---|---|
| 2,322,376 | 6/1943 | McCleary et al. | 260/45.95 |
| 3,234,177 | 2/1966 | Van Schotten | 260/45.95 |
| 3,310,587 | 3/1967 | O'Shea | 260/45.95 |
| 3,530,069 | 9/1970 | O'Neill | 260/45.95 |

*Primary Examiner*—Donald E. Czaja
*Assistant Examiner*—Eugene C. Rzucidlo
*Attorney, Agent, or Firm*—Willard R. Sprowls, Esq.

[57] ABSTRACT

The compunds are of the class dithiobis(beta-arylalkylene)diphenols and chain-extended polydithio-polyphenols derived therefrom. They are useful as anti-oxidants in compositions containing unsaturated rubbers — that is, so-called diene rubbers. A typical compound of the class is 4,4'-dithiobis(beta-phenylethylene)diphenol, made by the condensation of one mole of bis(beta-chlorophenethyl) disulfide with two moles of phenol. Chain extension is apt to occur by reaction of the first-formed dithio-diphenol with additional amounts of the dichloro coupling agent and the starting phenol, forming poly(dithio) polyphenolic compounds having repeated alternating units of the coupler and phenol moieties.

3 Claims, No Drawings

POLYALKADIENES STABILIZED WITH DITHIO-BIS(BETA-ARYLALKYLENE)DIPHENOLS

This is a division of application Ser. No. 251,723, filed May 8, 1972, which in turn, is a division of application Ser. No. 13,749, filed Feb. 24, 1970, now U.S. Pat. No. 3,686,325.

BACKGROUND OF THE INVENTION

The invention pertains to new phenolic compounds useful as stabilizers or antioxidants, to a method of making them, and to diene rubber compositions containing effective amounts of these stabilizers.

In the past, various highly hindered monophenols and diphenols having alkyl substituents ortho to the phenolic hydroxyl groups have been used as antioxidants. Some of these have had sulfur atoms linking two phenol rings either directly, as in U.S. Pat. Nos. 3,099,639 and 3,114,713, or through methylene bridges, as in U.S. Pat. Nos. 3,310,587 and 2,322,376, or through trimethylene groups, as in U.S. Pat. No. 3,234,177. In my U.S. application, Ser. No. 807,956, filed Mar. 17, 1969, I have described and claimed 4,4'-thiobis-(beta-arylalkylene)diphenols

SUMMARY OF THE INVENTION

I have discovered a new class of polyphenols wherein phenol rings are linked together by dithiobis-(beta-arylalkylene) radicals containing the essential structural grouping:

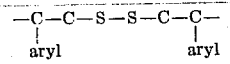

The new compounds accordingly are characterized by containing the essential skeletal structure:

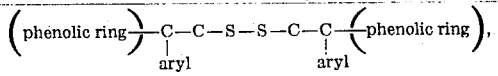

thus having each of two carbon atoms, beta to a dithio group, joined to two aromatic groups of which only one is phenolic. In many of the new products the beta,beta'-diaryldithio-dialkylene and phenolic ring configuration is repeated a number of times, yielding poly(dithio)-polyphenols of higher chain length and higher molecular weight.

DETAILED EXPOSITION OF THE INVENTION

My new compounds may be designated as bis[beta-(hydroxyaryl)-beta-arylalkyl] disulfides, or preferably as dithiobis-(beta-arylalkylene)diphenols, having the general formula

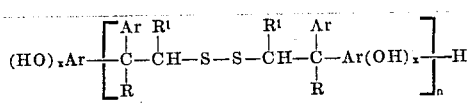

wherein
Ar is aryl,
R is H or an alkyl group having 1–4 carbon atoms,
R' is H or methyl, or is —$CH_2$— or —$CH_2CH_2$— joined ortho to the non-phenolic Ar,
x is 1 or 2, and
n is a number from 1 to 5.

When n is 1, the formula reduces to that of a dithio diphenol compound:

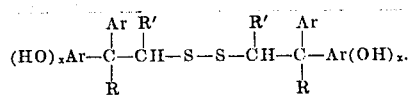

The simplest member of the class is 4,4'-dithiobis-(beta-phenylethylene)diphenol:

The new compounds are generally obtained as clear, pale yellow to brown, brittle resins which sinter in the range 40°–60°C. The products derived from phenols containing large alkyl groups as substituents, however, generally consist of viscous brown liquids.

That my products have the phenol nuclei linked to the coupling structure at ring carbon atoms, and are not phenol ethers, is clearly demonstrated by their infrared spectra, which show strong absorption at a frequency of 3600 $cm^{-1}$ which is characteristic of a phenolic hydroxyl group. In the case of my products made from the simpler phenols, the solubility of the products in aqueous alkali also demonstrates the presence of phenolic hydroxyl.

That my relatively unhindered phenolic compounds have high antioxidant activity is quite unexpected in view of the general consensus that phenolic antioxidants must, in order to be effective, be of the highly hindered type exemplified by the commercial antioxidant 2,2'-methylenebis(4-methyl-6-tert-butylphenol) and the like.

The relatively unhindered character of several of my new phenols renders them especially advantageous for incorporation in aqueous synthetic rubber latices: being soluble in aqueous alkali, they can be added to such latices as alkaline solutions, and are later coprecipitated with the rubber by the conventional coagulants, to recover the solid rubber containing the antioxidant finely and uniformly dispersed throughout the rubber. The antioxidants may, of course, be incorporated in rubber cements and solid rubbers by conventional milling and other techniques.

Preparation of my new antioxidants is accomplished by interacting a bis(beta-chloro-beta-arylalkyl) disulfide with a phenol having at least one reactive hydrogen on the ring, ortho or para to the hydroxyl. Hydrogen chloride is split off, the hydrogen atoms coming from the phenol nuclei, and, in the simplest form of the reaction, two molecules of the phenol are coupled together by one dithiobis(beta-arylalkylene) radical, to form a dithio diphenol product. This course of reaction is favored by the presence of a considerable excess of the phenol — as by mixing five moles of the phenol with one mole of the dichloro coupling agent, and heating the mixture. As the ratio of phenol to dichloro reagent is reduced, chain extension is induced whereby one or both phenol nuclei of the first-formed dithio diphenol compound react with further coupling agent and then with more of the original phenol. The resulting products contain in a chain n units of the dithiobis (beta-arylalkylene) coupling structure and n + 1 units of the starting phenol, the chain being terminated at both ends by phenol units. These chain-extended products are referred to as poly [dithiobis(beta-aryl alkylene)] polyphenols. The simple, unextended dithiobisphenol product will have a lower sulfur content, higher hydroxyl number, and lower molecular weight than the corresponding products which have undergone chain extension by further reaction with coupler and phenol.

Suitable phenols for use in my reaction are readily chosen, being those known to be readily capable of alkylation. They include the following:

| | |
|---|---|
| phenol | p-isopropylphenol |
| o-cresol | o-sec-butylphenol |
| m-cresol | o-sec-amylphenol |
| p-cresol | o-phenylphenol |
| 2,6-xylenol | m-benzyloxyphenol |
| 2,5-xylenol | p-methoxyphenol |
| 2,4-xylenol | p-(methylthio)phenol |
| 3,5-xylenol | catechol |
| alpha-naphthol | resorcinol |
| beta-naphthol | hydroquinone |
| o-t-butylphenol | guiacol |
| p-t-butylphenol | 4-t-octylresorcinol |
| 2-t-butyl-p-cresol | t-butylhydroquinone |
| 4-t-butyl-o-cresol | 4,4'-isopropylidenediphenol |
| o-allylphenol | 4,4'-oxydiphenol |
| p-nonylphenol | 4,4'-thiodiphenol |
| o-isopropylphenol | 4,4'-dithiodiphenol |
| m-isopropylphenol | |

Phenols fully substituted in the ortho and para positions, and highly hindered phenols such as 2,6-di-t-alkylphenols, and phenols having electronegative groups on the ring, do not react in the sense of my invention.

My new reaction is typified by the following diagrams:

1. Formation of a 1:2 dithio diphenol compound

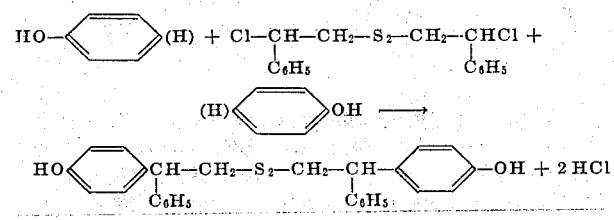

2. Formation of a polymeric, or chain-extended, product

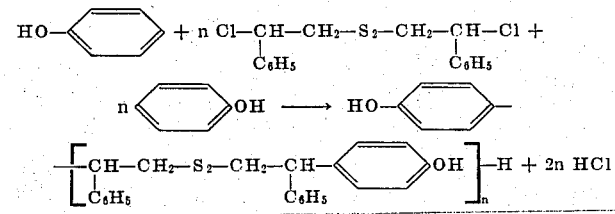

The reaction proceeds rapidly in the case of phenol itself, the cresols, and resorcinol, and less readily with the other phenols.

The reaction forming the new phenols of my invention may be accelerated by the addition of a catalytic amount of a Lewis acid, such as aluminum chloride, to the reaction mixture. This is particularly desirable in the case of mildly hindered phenols such as 2,6-xylenol and 2-tert-butylphenol, with which $AlCl_3$ is quite effective in promoting the reaction.

Mixtures of phenols may be used in my reaction in place of a single phenol. Thus, technical grades of cresylic acid, which are mixtures of isomeric cresols, may be used.

It is often convenient to use an inert liquid reaction medium in carrying out the reaction of my invention, to keep the reaction mixture fluid. Often the solvent will be the same one used in preparing the dichloro coupling agent. This is usually a saturated hydrocarbon — for example, hexane, cyclohexane, or petroleum ether; or an aromatic hydrocarbon — for example, benzene, toluene or xylene. In the case of highly polar phenols such as resorcinol or hydroquinone, it is preferable to use an inert polar solvent, acetonitrile being quite suitable.

The temperature at which my reaction is carried out is not critical. Temperatures in the range from 50° to 100°C. are effective and convenient, and the time required for completing the reaction is generally from 4 to 24 hours. The reaction is judged to be complete when the generation of hydrogen chloride has ceased. I then usually subject the reaction mixture to steam distillation in order to remove, first, the solvent, and then as much of the unreacted phenol as possible. Vacuum distillation may be used when needed, to remove phenols not volatile with steam. Unreacted phenols may also be removed by washing with hot water or by fractional precipitation from suitable mixed solvents.

The bis(beta-chloro-beta-arylalkyl) disulfides, employed as the bifunctional alkylating agent or coupling agent in preparing my new phenolic products, are themselves new compounds. Their preparation has been made possible by my discovery that, under certain conditions, and contrary to the literature (cf. Pope and Smith, in J. Chem. Soc. 1922, volume 121, page 1166), sulfur monochloride, $S_2Cl_2$, can be made to react with styrene and like arylolefin compounds to form pure bis(2-chloro-2-arylethyl) disulfides, in excellent yield, instead of the monosulfides reported by Pope and Smith. The conditions required for the production of the disulfides are that the styrene (or other arylolefin) be diluted with at least an equal volume of an inert solvent, and that the temperature of the reaction be kept below 45°C. Since sulfur monochloride is obtainable in rather high purity, the adducts with arylolefins are obtained in a high degree of purity.

Sulfur monochloride reacts with an arylolefin in the following sense, using styrene as an example:

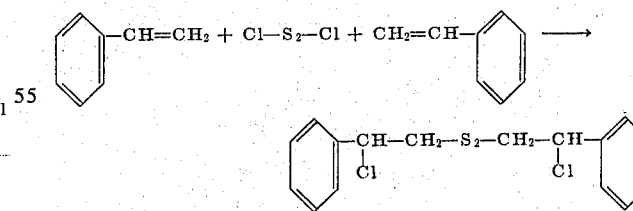

Other arylolefins suitable for use in this reaction include the following:

| | |
|---|---|
| alpha-methylstyrene | acenaphthalene |
| p-tert-butylstyrene | vinyltoluene |
| 1,2-dihydronaphthalene | anethole |
| 1-phenylcyclohexene | indene |
| p-chlorostyrene | |

The beta-aryl groups characteristic of my coupling agents accordingly may contain chloro or various hydrocarbon and hydrocarbonoxy substituents.

When bis(beta-chlorophenethyl) disulfide is mixed with a molally large excess of phenol, hydrogen chloride is rapidly evolved and there is formed 4,4'-dithiobis-(beta-arylethylene)diphenol. The product is soluble in aqueous alkali, and its infrared spectrum confirms the presence of para-disubstituted benzene rings. When p-cresol is used in place of phenol, the coupling agent enters the ring ortho to the hydroxyl and the resulting bisphenol is too hindered sterically to permit solution in aqueous alkali.

It might be thought that the large amount of hydrogen chloride liberated in the coupling reaction would cause cleavage of the disulfide bond in the product, but such is not the case.

DESCRIPTION OF PREFERRED EMBODIMENTS

Bis(beta-chloro-beta-arylalkyl) Disulfides

EXAMPLE 1

Reaction of Styrene with Sulfur Monochloride

To a solution of 208 g. (2.0 moles) of styrene in 200 g. of n-hexane was added 135 g. (1.0 mole) of sulfur monochloride. The temperature of the resulting yellow solution was prevented from exceeding 40°C. during the ensuing reaction by intermittent cooling over a period of 4 hours. After standing at room temperature for an additional 20 hours, the mixture had separated into two layers. Upon removal of the hexane in a vacuum rotary evaporator, there was obtained 343 g. of bis(-beta-chlorophenethyl) disulfide as a clear yellow, viscous liquid having the following analysis:

| | |
|---|---|
| Calc'd. for $C_{16}H_{16}Cl_2S_2$: | C, 56.00; H, 4.66; Cl, 20.70; S, 18.66 |
| Found: | C, 56.22; H, 4.54; Cl, 20.66; S, 19.08 |

The product prepared in this manner is quite stable in the absence of moisture. After three to four weeks, it remains as a clear yellow liquid.

For many applications it is not necessary to isolate the bis(beta-chlorophenethyl) disulfide. The reaction of the styrene and sulfur monochloride can be carried out in a solvent such as benzene, toluene or cyclohexane and the resulting solution of the product employed for reaction with various phenols.

EXAMPLE 2

Reaction of t-Butylstyrene with Sulfur Monochloride

The commercial t-butylstyrene employed in this reaction consists of a mixture of 95% p-t-butylstyrene and 5% m-t-butylstyrene.

To a solution of 320 g. (2.0 moles) of t-butylstyrene in 300 g. of n-hexane was added 135 g. (1.0 mole) of sulfur monochloride. During three hours a cold water bath was applied intermittently to prevent the temperature from exceeding 45°C. After standing for 24 hours at room temperature, the hexane was removed in a vacuum rotary evaporator. There was obtained 455 g. of bis[beta-chloro-beta-(t-butylphenyl)ethyl] disulfide as a viscous, light amber liquid.

| | |
|---|---|
| Calc'd. for $C_{24}H_{32}Cl_2S_2$: | % Cl, 15.60; % S, 14.06 |
| Found: | % Cl, 15.47; % S, 14.65 |

EXAMPLE 3

Reaction of Vinyltoluene with Sulfur Monochloride

Since commercial vinyltoluene consists of a mixture of 60% m-methylstyrene and 40% p-methylstyrene, its reaction product with sulfur monochloride will consist of a mixture of isomeric arylalkyl disulfides.

To a solution of 236 g. (2.0 moles) of vinyltoluene in 300 ml. of n-hexane was added 135 g. (1.0 mole) of sulfur monochloride. The resulting clear yellow solution showed no signs of an exothermic reaction until after standing for 2 to 3 hours, after which the temperature gradually rose to 35°C.; the mixture was then cooled to 26°C. and occasional cooling was employed over the next 4 hours to prevent the temperature from exceeding 35°C. After the exothermic reaction had subsided, the mixture was allowed to stand at room temperature for an additional 18 hours. Removal of the hexane in a vacuum rotary evaporator gave 372 g. of a mixture of isomeric bis(beta-chloro-beta-tolylethyl) disulfides, consisting of a clear yellow, viscous liquid.

| | |
|---|---|
| Calc'd. for $C_{18}H_{20}Cl_2S_2$: | % Cl, 19.14; % S, 17.25 |
| Found: | % Cl, 19.11; % S, 16.90 |

EXAMPLE 4

Reaction of Indene with Sulfur Monochloride

To a solution of 116 g. (1.0 mole) of indene in 300 ml. of n-hexane was added 67.5 g. (0.50 mole) of sulfur monochloride. After standing at 26°–28°C. for 5 hours, the clear yellow solution gradually warmed to 36°C. over a period of 2 hours, as the color of the solution slowly changed from bright yellow to light brown. At the end of 7 hours, the reaction mixture was immersed in a 25°C. water bath and allowed to stand for an additional 18 hours. The hexane was stripped from the two-phase mixture, leaving 184 g. of 2,2'-dithiobis-1-chloroindane as a clear, viscous, brown liquid.

| | |
|---|---|
| Calc'd. for $C_{18}H_{16}Cl_2S_2$: | % S, 17.44 |
| Found: | % S, 17.32 |

This compound is less stable than that derived from styrene. On standing at room temperature for 2 to 3 days, there takes place an appreciable evolution of hydrogen chloride. Upon being warmed to 75°–80°C., the rate of hydrogen chloride evolution becomes quite rapid.

EXAMPLE 5

Reaction of a-Methylstyrene with Sulfur Monochloride

To a solution of 118 g. (1.0 mole) of freshly distilled alpha-methylstyrene in 400 ml. of ether was added 67.5 g. (.50 mole) of sulfur monochloride. During one hour the temperature of the mixture gradually rose from 25°C. to 32°C., and over the next one-half hour the temperature reached 42°C. and the ether refluxed quite rapidly for 20 to 30 minutes. After the exothermic reaction had subsided, the mixture stood at room temperature for 18 hours. Removal of the ether from the clear yellow solution gave 186 g. of bis(beta-chloro-beta-phenylpropyl) disulfide as a clear yellow oil which slowly liberates fumes of hydrogen chloride on standing at room temperature.

| Calc'd. for $C_{18}H_{20}Cl_2S_2$: | % S, 17.25 |
|---|---|
| Found: | % S, 17.89 |

Dithiobis(beta-arylalkylene)diphenols

In carrying out the synthesis of the bisphenolic and higher polyphenolic disulfides of this invention, it is not necessary to isolate the intermediate bis(beta-chloro-beta-arylalkyl) disulfides. Generally, it is most convenient to carry out the reaction of the alpha-arylolefin with sulfur monochloride in a solvent such as benzene, toluene or xylene and then add to this solution the phenolic compound to be alkylated. The presence of an inert solvent also prevents the reaction mixture from becoming too viscous for efficient agitation.

EXAMPLE 6

Reaction of Bis(beta-chlorophenethyl) Disulfide with Phenol

Only by use of a large excess of phenol in this reaction can the product be expected to consist mainly of the bis-phenolic disulfide. As the amount of excess phenol is reduced, the extent to which the initially formed bis-phenolic disulfide is further alkylated by the bis-chloroarylalkyl disulfide to form higher polyphenolic disulfides is increased.

To a solution of 376 g. (4.0 moles) of phenol in 250 ml. of toluene was added 343 g. (1.0 mole) of bis(beta-chlorophenethyl) disulfide. During one hour this solution was stirred and heated to 50°C. This caused the rapid evolution of hydrogen chloride. Stirring was continued for an additional 2 hours as the temperature of the mixture was maintained in the range 50° to 60°C. The temperature of the mixture was then raised to 70°-75°C., where it was maintained for an additional 2 hours. After a further heating at 80°-85°C. for 2 hours, the evolution of hydrogen chloride had subsided. After standing overnight at room temperature, the mixture was subjected to steam distillation to remove the toluene and excess phenol. The distillate gave a negative ferric chloride test for phenol after 4 hours of steam distillation. The viscous, molten residue was then heated under vacuum to remove water. After heating to 110°-115°C. under a vacuum of 2-3 mm., the clear molten residue (436 g.) was poured onto aluminum foil. At room temperature the product, bis[beta-(4-hydroxyphenyl)phenethyl] disulfide, also called 4,4'-dithiobis(beta-phenylethylene)diphenol, consists of a clear yellow, brittle resin which is soluble in methanol, acetone, and benzene, but insoluble in hexane. It is soluble in aqueous sodium hydroxide solution.

| Calc'd. for $C_{28}H_{26}O_2S_2$: | | Found: |
|---|---|---|
| Mol. wt., 458 | | 496 |
| Hydroxyl No., 244 | | 235 |
| % S, 13.97 | | 14.70 |

EXAMPLE 7

Reaction of Bis(beta-chlorophenethyl) Disulfide with o-Cresol

In this example, a large excess of o-cresol was used in order to obtain only the bis-phenolic disulfide, and no additional solvent was needed.

A mixture of 172 g. (0.50 mole) of bis(beta-chlorophenethyl) disulfide and 432 g. (4.0 moles) of o-cresol was agitated and heated to 60°-65°C. as hydrogen chloride was rapidly evolved. Over a period of 7 hours the temperature was slowly raised to 85°C. At this stage, the evolution of hydrogen chloride had ceased. Most of the excess o-cresol was then removed by distillation under aspirator vacuum. The viscous residue was then subjected to steam distillation for 5½ hours to remove the last traces of o-cresol. The product was then dried by heating slowly to a final temperature of 130°C. under a vacuum of 1.0 mm. After cooling to room temperature, there was obtained 241 g. of bis[(2-(3-methyl-4-hydroxyphenyl)-2-phenyl-ethyl] disulfide as a clear yellow, brittle resin which is soluble in aqueous sodium hydroxide solution. Though soluble in methanol, acetone and benzene, this product is insoluble in hexane.

| Calc'd. for $C_{30}H_{30}O_2S_2$: | % S, 13.17; Hydroxyl No., 230 |
|---|---|
| Found: | % S, 12.91; Hydroxyl No., 225 |

EXAMPLE 8

Reaction of 2,2'-Dithiobis-1-chloroindane with Phenol

A mixture of 183 g. (0.50 mole) of 2,2'-dithiobis-1-chloroindane and a solution of 141 g. (1.50 moles) of phenol in 300 ml. of benzene was warmed to 40°C. This caused rapid evolution of hydrogen chloride which continued for about 30 minutes before subsiding. The mixture was then stirred at 50°-60°C. for 5 hours to complete the reaction. The mixture was then steam-distilled for 3 hours to remove the benzene and excess phenol. The product was then dissolved in ether and separated from the water. Removal of the ether gave 234 g. of 2,2'-dithiobis-1-(4-hydroxyphenyl)indane as a dark brown, brittle resin which readily forms a water-soluble potassium salt when treated with an aqueous solution of potassium hydroxide.

| Calc'd. for $C_{30}H_{26}O_2S_2$: | % S, 13.27 |
|---|---|
| Found: | % S, 13.41 |

EXAMPLE 9

Reaction of Chlorostyrene with Sulfur Monochloride followed by Reaction with o-Cresol In this example commercial chlorostyrene, which consists of a mixture containing 65% of o-chlorostyrene and 35% of p-chlorostyrene was employed. Consequently, both the intermediate chlorodisulfide and the resulting phenolic disulfide will comprise mixtures of isomers.

By first reacting 69 g. (0.50 mole) of chlorostyrene with 34 g. (0.25 mole) of sulfur monochloride in hexane, there was prepared 103 g. (0.25 mole) of bis[beta-chloro-beta-(chlorophenyl)ethyl] disulfide. This was mixed with 162 g. (1.50 moles) of o-cresol and stirred at 60°–70°C. for 5 hours. After standing overnight, the reaction mixture was stripped with steam to remove the o-cresol, and then dried by heating under vacuum. There was obtained 136 g. of bis[beta-(3-methyl-4-hydroxyphenyl)-beta-(chlorophenyl)ethyl] disulfide as a clear, amber, brittle resin.

Calc'd. for $C_{30}H_{28}Cl_2O_2S_2$: % Cl, 12.79; % S, 11.53
Found: % Cl, 12.75; % S, 11.46

EXAMPLE 10

Reaction of Bis[beta-chloro-beta-(t-butylphenyl)ethyl] Disulfide with Phenol

The coupling agent used in this example was prepared from commercial t-butylstyrene consisting of 95% of p-t-butylstyrene and 5% of m-t-butylstyrene.

To a solution of 141 g. (1.50 moles) of phenol in 500 ml. of benzene was added 228 g. (0.50 mole) of bis[beta-chloro-beta-(t-butylphenyl)ethyl] disulfide. After this mixture was stirred for 7 hours at 60°–65°C., the evolution of hydrogen chloride was complete. By subjecting this mixture to steam distillation for 4½ hours, all of the excess phenol was removed. The viscous residue was dissolved in benzene and separated from the water. The benzene was removed and the residue heated to 110°–115°C. for ½ hour under a vacuum of 1–2 mm. There was obtained 275 g. of 4,4'-dithiobis[beta-(t-butylphenyl)ethylene]diphenol as a clear, brown, brittle resin which is soluble in methanol, acetone and benzene, but insoluble in hexane.

% S calc'd. for $C_{36}H_{42}O_2S_2$: 11.23; found, 11.54.

EXAMPLE 11

Reaction of Bis(beta-chloro-beta-tolylethyl) Disulfide with Mixed Meta & Para Cresols This example demonstrates the use of both a mixture of styrenes and a mixture of phenols to be alkylated. Commercial vinyltoluene, consisting of a mixture of 60% m-methylstyrene and 40% p-methylstyrene, was first reacted with sulfur monochloride to yield a mixture of isomeric bis(beta-chloro-beta-tolylethyl) disulfides. A mixture of 186 g. (0.50 mole) of these disulfides, with 135 g. (1.25 moles) of meta-para cresols was stirred for 5 hours at 60°–70°C. The excess cresols were then removed by steam distilling 4 hours. The viscous residue was dissolved in ether and separated from the water. After removal of the ether, the residue was heated to 100°–115°C. for ½ hour under a vacuum of 2–3 mm. The product consisted of 243 g. of a clear yellow, brittle resin, being a mixture of many isomeric dithiobis(beta-tolylethylene)dicresols.

% S: calc'd. for $C_{32}H_{34}O_2S_2$, 12.46; found, 13.50

EXAMPLE 12

Reaction of Bis(beta-chlorophenethyl) Disulfide with p-Nonylphenol

The p-nonylphenol used in this example is distilled commercial material prepared by the alkylation of phenol with tripropylene.

A mixture of 172 g. (0.50 mole) of bis(betachlorophenethyl) disulfide and 264 g. (1.20 moles) of p-nonylphenol was stirred at 60°–80°C. for 7 hours as hydrogen chloride was slowly evolved. After standing overnight the mixture was stirred for an additional 7 hours in the temperature range 70°–90°C. p-Nonylphenol was then removed by vacuum distillation at 0.1 to 0.5 mm. and heating the residue gradually to 140°C. The residue amounted to 335 g. of 2,2'-dithiobis(beta-phenylethylenedi(4-nonylphenol), a clear, amber, tacky resin which is soluble in hexane.

% S: calc'd. for $C_{46}H_{62}O_2S_2$, 9.01; found, 8.82

EXAMPLE 13

Reaction of Bis(beta-chlorophenethyl) Disulfide with p-t-Butylphenol

A mixture of 343 g. (1.0 mole) of bis(beta-chlorophenethyl) disulfide, 300 g. of toluene and 375 g. (2.50 moles) of p-t-butylphenol was stirred and heated at 75°–80°C. for 8 hours. After standing overnight at room temperature, the mixture was subjected to steam distillation for 5 hours to remove the toluene and excess p-t-butylphenol. The viscous residue was then heated under vacuum to remove traces of water. There was obtained 506 g. of a light amber, brittle resin. This is 89% of the theoretical yield (570 g.) of 2,-2'-dithiobis(beta-phenylethylene)di(4-t-butylphenol).

% S: calc'd. for $C_{36}H_{42}O_2S_2$, 11.23; found, 12.40

EXAMPLE 14

Reaction of 2,2'-Dithiobis-1-chloroindane with o-t-Butylphenol

A mixture of 183 g. (.50 mole) of 2,2'-dithiobis-1-chloroindane, 300 ml. of hexane and 187 g. (1.25 moles) of o-t-butylphenol was stirred at 40°–50°C. for 16 hours as hydrogen chloride was evolved. This mixture was then steam-distilled for 4 hours to remove to the hexane and excess o-t-butylphenol. The viscous residue was then heated under vacuum to remove traces of water. There was obtained 280 g. of 2,2'-dithiobis[1-(3-t-butyl-4-hydroxyphenyl)indane], also called 4,4'-(2,2'-dithiodiindan-1-yl)di(2-t-butylphenol), as a dark brown, brittle resin.

% S: calc'd. for $C_{38}H_{42}O_2S_2$, 10.77; found 11.52

EXAMPLE 15

Reaction of Bis(beta-chlorophenethyl) Disulfide with Resorcinol

To a solution of 550 g. (5.0 moles) of resorcinol in 600 ml. of acetonitrile was added 686 g. (2.0 moles) of bis(beta-chlorophenethyl) disulfide. While stirring this mixture without heating, there was observed a very rapid evolution of hydrogen chloride. After 3 hours, the reaction mixture was placed under aspirator vacuum and heated, to remove the acetonitrile. During two hours the temperature of the mixture was gradually raised to 90°C. The molten residue was twice extracted with two 500-ml. portions of hot water to remove most of the excess resorcinol. After cooling, the residue was dissolved in ether and the ether solution was extracted three times with 500-ml. portions of water. After removal of the ether there was obtained 838 g. of 4,4'-dithiobis(beta-phenylethylene)diresorcinol as a brittle, dark brown resin. When pulverized, it gives a bright yellow powder which fuses in the range 70°–80°C.

% S: calc'd. for $C_{28}H_{26}O_4S_2$, 13.06; found, 13.06.

EXAMPLE 16

Reaction of Bis(beta-chlorophenethyl) Disulfide with 2,6-Xylenol

A mixture of 343 g. (1.0 mole) of bis(beta-chlorophenethyl) disulfide, 200 ml. of benzene and 275 g. (2.25 moles) of 2,6-xylenol was stirred at 50°–55°C. for 1 hour. There was no evidence of evolution of any hydrogen chloride. Upon the addition of 1.0 g. of anhydrous aluminum chloride, evolution of hydrogen chloride became rapid. After stirring at 50°–55°C. for an additional 16 hours, the mixture was washed with dilute aqueous hydrochloric acid and then subjected to steam distillation for 4 hours to remove the excess xylenol. The product was then dried by heating under vacuum. There was obtained 513 g. of 4,4'-dithiobis(beta-phenylethylene)di-2,6-xylenol as a brittle, amber resin which is soluble in aqueous alkali.

| | |
|---|---|
| Calc'd. for $C_{32}H_{34}O_2S_2$: | %S, 12.45; mol.wt., 514; Hydroxyl No., 21 |
| Found: | %S, 12.29; mol.wt., 520; Hydroxyl No., 22 |

DESCRIPTION OF USES OF THE POLYPHENOLS OF THE INVENTION

The polyphenolic disulfide compositions of this invention find utility as effective antioxidants for a variety of elastomers and thermoplastic polymers. Among test methods that are commonly for evaluation of the antioxidant activity are:

1. The carbonyl development test, in which the extent of oxidation of the stabilized material is followed by taking infrared spectra of the sample at intervals during aging of polymer films. [See Bishop, Anal. Chem., 33, 456 (1961)].
2. The effect of heat and oxygen upon the Mooney viscosity of the stabilized polymer.
3. The effect of oxidative degradation of the polymer upon its tensile strength.

Examples of the use of these different test methods are selected here to demonstrate the antioxidant activity of my new polyphenolic disulfide compositions in various elastomers. For convenience in identifying the compounds used in the various tests, the following list is provided, with identifying code designations:

| Code | Structure |
|---|---|
| S-1 | 4,4'-dithiobis(beta-phenylethylene)diphenol |
| S-2 | 4,4'-dithiobis(beta-phenylethylene)di-o-cresol |
| S-3 | 4,4'-(2,2'-dithiodiindan-1-yl)diphenol |
| S-4 | 2,2'-dithiobis(beta-phenylethylene)di(4-nonylphenol) |
| S-5 | 2,2'-dithiobis(beta-phenylethylene)di(4-t-butylphenol) |
| S-6 | 4,4'-(2,2'-dithiodiindan-1-yl)di(2-t-butylphenol) |
| S-7 | dithiobis(beta-phenylethylene)dicresol[a] |
| S-8 | dithiobis(beta-tolylethylene)dicresol[b] |
| S-9 | 4,4'-dithiobis[beta-(4-t-butylphenyl)ethylene]diphenol |
| S-10 | 4,4'-dithiobis[beta-(chlorophenyl)ethylene]di-o-cresol[c] |

[a] An isomeric mixture derived from commercial mixed m,p-cresols.
[b] An isomeric mixture derived from vinyltoluene (a mixture of m-methylstyrene and p-methylstyrene) and from mixed m,p-cresols.
[c] An isomeric mixture derived from a mixture of o-chlorostyrene and p-chlorostyrene.

Solution SBR

Rubber in the form of a benzene solution of commercial styrene-butadiene rubber (solution-polymerized SBR) containing 5% of polymer was used in this test. Sufficient amounts of benzene solutions of the compounds to be tested as antioxidants were added to aliquots of the polymer solution so as to incorporate one part of antioxidant per 100 parts of polymer. By evaporation of the solvent, thin films of the polymer were prepared on sodium chloride discs (salt plates). These films were aged in air at 130°C. and removed from the oven at 1-hour intervals after the first ½ hour. Infrared spectra were run on these films and note made of the appearance of a carbonyl peak at 5.85 microns. The aging time required to cause the appearance of this peak, denoted the "break time," is used as a measure of the effectiveness as an antioxidant of the compound incorporated into the polymer, by comparison with the break time of the unstabilized polymer.

| Added Stabilizer | Break Time (hrs.) |
|---|---|
| None | 0.5 |
| Polygard* | 1 |
| 2,6-di-t-butyl-p-cresol* | 1 |
| S-1 | 13 |
| S-2 | 15 |
| S-3 | 11 |
| S-4 | 8 |
| S-5 | 8 |
| S-6 | 11 |
| S-7 | 40 |
| S-8 | 25 |
| S-9 | 6 |
| S-10 | 8 |

(* — a commercial anti-oxidant)

These results correlate well with visual observation of the condition (extent of resinification) of samples of the solid polymer heat-aged under the same conditions. These results show that my tested compounds are effective stabilizers for solution SBR rubber, being much superior to the commercial monophenols tested in this environment.

Polybutadiene

A solution containing 8 percent by weight of commercial polybutadiene in toluene was used for evaluating the compounds as antioxidants by the carbonyl test described above. The compounds tested were used at the level of 1 part per 100 parts of polybutadiene. The samples were aged at 130°C. in a circulating air oven.

| Added Stabilizer | Break Time (hrs.) |
|---|---|
| None | 0.25 |
| S-1 | 4 |
| S-2 | 12 |
| S-3 | 4 |
| S-4 | 6 |
| S-5 | 4 |
| S-6 | 4 |
| S-7 | 12 |
| S-8 | 5 |
| S-10 | 7 |

These data show the ability of the compounds tested to stabilize polybutadiene against oxidation.

Polyisoprene

When milled at 300°F., polyisoprene undergoes an oxidative degradation, the extent of which can be measured by the change in its Mooney viscosity. By the incorporation of stabilizers, the rate of decrease in Mooney viscosity can be reduced. The data below show the ability of several compounds of this invention to retard the degradation of commercial polyisoprene during milling at 300°F. The compounds tested were added at the level of 1 part per 100 parts of commercial polyisoprene.

| at 300°F. for time T | ML-4 at 212°F. after Milling | | |
|---|---|---|---|
| Added Stabilizer | T = 0 | T = 10 min. | T = 15 min. |
| None | 62 | 37.5 | 23 |
| S-1 | 72 | 61 | 50.5 |
| S-2 | 70 | 67 | 57 |
| S-4 | 70 | 49 | 41 |
| S-5 | 69 | 54 | 44 |
| S-6 | 70 | 66.5 | 34.5 |
| S-7 | 70 | 63.5 | 49 |
| S-8 | 69 | 65 | 58 |
| S-9 | 71 | 53.5 | 41.5 |
| S-10 | 70 | 66.5 | 55.5 |

Natural Rubber

The rubber stock in which the compounds were evaluated as antioxidants had the following composition:

| | |
|---|---|
| Pale crepe | 100 |
| Lithopone | 60 |
| Zinc oxide | 10 |
| Snowflake whiting | 60 |
| Zinc laurate | 0.5 |
| Sulfur | 3.0 |
| Tetramethyl thiuram sulfide | 0.15 |

The compounds tested were added at the level of 1 parts per 100 parts of pale crepe. Samples of the vulcanized stocks were then aged in oxygen at 70°C. for 48 hours and the tensiles and elongations compared with the values for the unaged stock. The percent of retention of tensile (T/To) and of elongation (E/Eo) are measures of the effectiveness of the compounds added as antioxidants.

| Added Stabilizer | T/To | E/Eo |
|---|---|---|
| None | Too brittle to measure | |
| S-1 | 80 | 95 |
| S-2 | 88 | 93 |
| S-3 | 75 | 94 |
| S-4 | 87 | 100 |
| S-5 | 99 | 100 |
| S-7 | 88 | 98 |
| S-8 | 85 | 98 |
| S-9 | 78 | 96 |

I claim:

1. A composition comprising an elastomer derived from an alkadiene, said elastomer containing as stabilizer an effective amount of a polyphenolic product of the following formula:

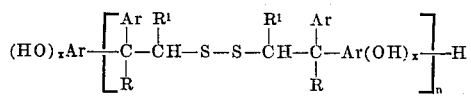

wherein
Ar is aryl,
R is H or an alkyl group having 1-4 carbon atoms,
R' is H or methyl, or is —$CH_2$— or —$CH_2CH_2$— joined ortho to the non-phenolic Ar,
x is 1 or 2, and
n is a number from 1 to 5 wherein positions ortho and para to the phenolic hydroxy group cannot be fully substituted, positions ortho to the phenolic hydroxyl group cannot contain more than one tertiary alkyl substituent and the phenolic ring cannot have an electronegative group substituent.

2. A composition according to claim 1 wherein the elastomer is a diene rubber.

3. A composition according to claim 1 wherein the stabilizer is 4,4'-dithiobis(beta-phenylethylene)-diphenol.

* * * * *